US012608499B2

(12) United States Patent
Teshome et al.

(10) Patent No.: US 12,608,499 B2
(45) Date of Patent: Apr. 21, 2026

(54) MANAGING A DATA PROCESSING SYSTEM USING A MANAGEMENT CONTROLLER AND A SECURED STORAGE REGION

(71) Applicant: Dell Products L.P., Round Rock, TX (US)

(72) Inventors: Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, McKinney, TX (US); Adolfo Sandor Montero, Pflugerville, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/820,525

(22) Filed: Aug. 30, 2024

(65) Prior Publication Data

US 2026/0064869 A1 Mar. 5, 2026

(51) Int. Cl.
*G06F 21/62* (2013.01)

(52) U.S. Cl.
CPC ................................. *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |
| 9,215,244 B2 | 12/2015 | Ayyagari et al. |
| 9,734,169 B2 | 8/2017 | Redlich et al. |
| 10,176,308 B2 | 1/2019 | Mintz et al. |

(Continued)

OTHER PUBLICATIONS

Ahmad Muzaffar Bin Baharudin. (Nov. 20, 2023). "How to optimize your data storage workload by offloading data within watsonx.data", IBM. watsonx.data. <https://community.ibm.com/community/user/watsonx/blogs/ahmad-muzaffar-bin-baharudin/2023/11/18/how-to-offload-data-from> retrieved on Aug. 28, 2024 (4 pages).

(Continued)

*Primary Examiner* — Sangseok Park
(74) *Attorney, Agent, or Firm* — WOMBLE BOND DICKINSON (US) LLP

(57) ABSTRACT

Methods and systems for managing operation of a data processing system are disclosed. To manage the data processing system, a management controller of the data processing system may establish, cooperatively with a storage device hosted by hardware resources of the data processing system, a secured management region of the storage device and security data for accessing data on the secured management region. The secured management region may be established based on a secured storage policy that may be obtained by the management controller from a management system via an out-of-band communication channel. The management controller may obtain data from the secured management region for use in updating operation of the data processing system.

20 Claims, 8 Drawing Sheets

(56)  References Cited

U.S. PATENT DOCUMENTS

| | | | |
|---|---|---|---|
| 10,298,670 | B2 | 5/2019 | Ben-Shael et al. |
| 10,534,417 | B1 * | 1/2020 | Ortega Gutierrez .. G06F 1/3268 |
| 10,671,765 | B2 | 6/2020 | Swierk et al. |
| 11,036,902 | B2 | 6/2021 | Nicholas |
| 11,102,122 | B2 | 8/2021 | Seed et al. |
| 11,134,380 | B2 | 9/2021 | Fox et al. |
| 11,487,274 | B2 | 11/2022 | Valder et al. |
| 11,792,267 | B2 | 10/2023 | Kreiner et al. |
| 2005/0226192 | A1 | 10/2005 | Red |
| 2011/0087387 | A1 | 4/2011 | Safa-Bakhsh et al. |
| 2013/0017806 | A1 | 1/2013 | Sprigg |
| 2013/0074186 | A1 | 3/2013 | Muttik |
| 2013/0225151 | A1 | 8/2013 | King |
| 2014/0189778 | A1 | 7/2014 | Li |
| 2015/0208356 | A1 | 7/2015 | Niu |
| 2016/0119358 | A1 | 4/2016 | Laadan |
| 2017/0012981 | A1 | 1/2017 | Obaidi |
| 2017/0097875 | A1 * | 4/2017 | Jess ..................... G06F 11/1092 |
| 2017/0118649 | A1 * | 4/2017 | Yang ...................... H04L 63/10 |
| 2017/0180993 | A1 | 6/2017 | Kelly |
| 2018/0004377 | A1 | 1/2018 | Kitchen |
| 2018/0039946 | A1 | 2/2018 | Bolte et al. |
| 2018/0124461 | A1 | 5/2018 | Vivien |
| 2019/0251275 | A1 * | 8/2019 | Ramrakhyani ..... G06F 21/6218 |
| 2020/0233983 | A1 | 7/2020 | Robison |
| 2021/0034048 | A1 | 2/2021 | Hajizadeh |
| 2021/0037018 | A1 | 2/2021 | Joyce |
| 2021/0073211 | A1 | 3/2021 | Wright, Sr. |
| 2021/0126823 | A1 | 4/2021 | Poess |
| 2022/0038659 | A1 | 2/2022 | Michel |
| 2022/0129335 | A1 | 4/2022 | Cseri |
| 2024/0020050 | A1 * | 1/2024 | Colline ................. G06F 3/0679 |
| 2024/0323016 | A1 * | 9/2024 | Lambert ............... H04L 9/0841 |
| 2025/0245061 | A1 | 7/2025 | Sinha |

OTHER PUBLICATIONS

Belal Mahmoud. (Jan. 19, 2024). "A Complete Guide to AI Identity Verification", KYC AML Guide. <https://kycaml.guide/blog/a-complete-guide-to-ai-identity-verification/#:~: text=The%20use%20of%20artificial%20intelligence,get%20scanned%20in%20no%20time> retrieved on Aug. 28, 2024 (4 pages).

Chow et al. (Dec. 6, 2023). "How we used OpenBMC to support AI inference on GPUs around the world", Cloudfare, The cloudflare Blog. < https://blog.cloudflare.com/how-we-used-openbmc-to-support-ai-inference-on-gpus-around-the-world/> retrieved on Aug. 28, 2024 (6 pages).

Cisco. "NextGen Out-of-Band Data Center Management Network with EVPN VXLAN", Jun. 23, 2023, <https://www.cisco.com/c/en/us/td/docs/dcn/whitepapers/nextgen-oob-datacenter-mgmt-nw-with-evpn-vxlan.html> retrieved on Aug. 28, 2024 (35 pages).

Perle Systems. "Out-of-Band Management: What is it and why do I need it?" webpage <https://www.perle.com/supportfiles/out-of-band-management.shtml>, 3 pages, May 20, 2024, retrieved from Internet Archive Wayback Machine <https://web.archive.org/web/20240520174409/https://www.perle.com/supportfiles/out-of-band-management.shtml> on Aug. 28, 2024.

* cited by examiner

FIG. 2B

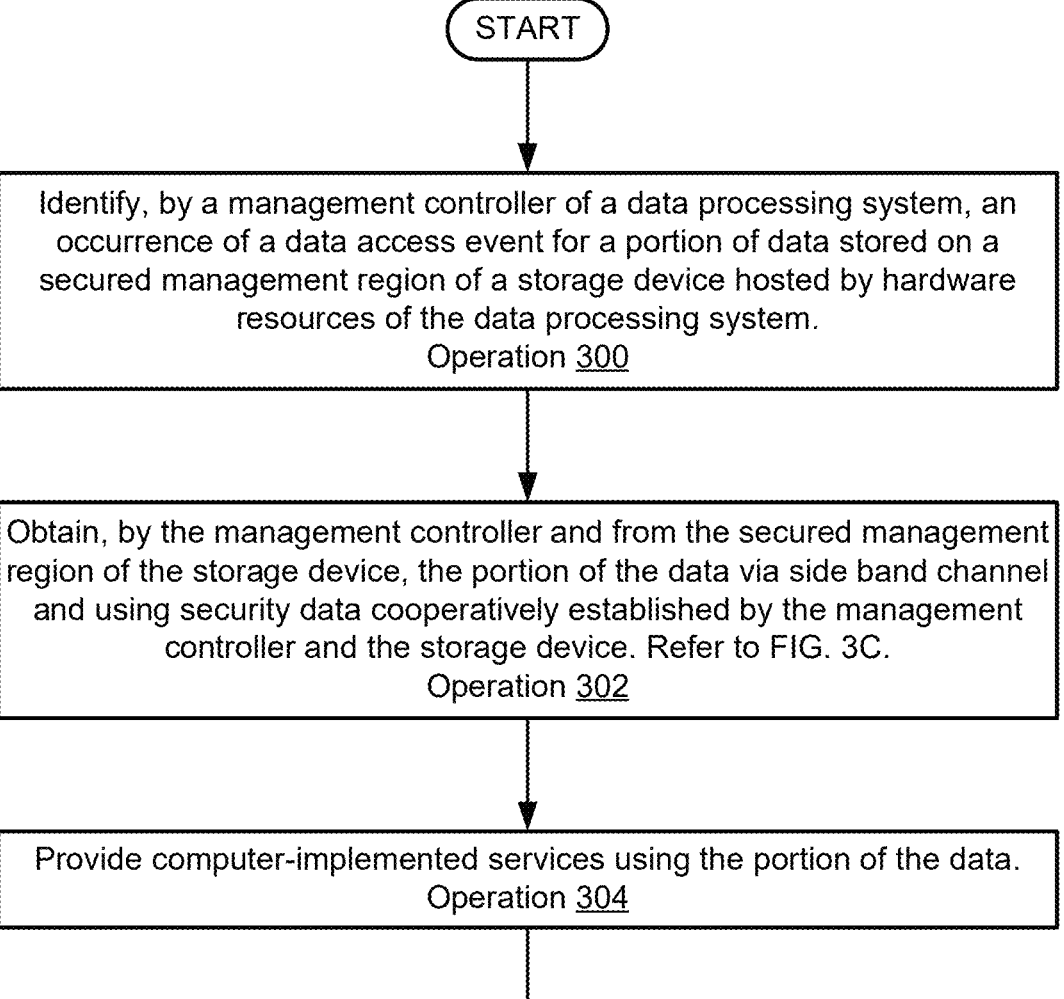

START

Identify, by a management controller of a data processing system, an occurrence of a data access event for a portion of data stored on a secured management region of a storage device hosted by hardware resources of the data processing system.
Operation 300

Obtain, by the management controller and from the secured management region of the storage device, the portion of the data via side band channel and using security data cooperatively established by the management controller and the storage device. Refer to FIG. 3C.
Operation 302

Provide computer-implemented services using the portion of the data.
Operation 304

END

FIG. 3A

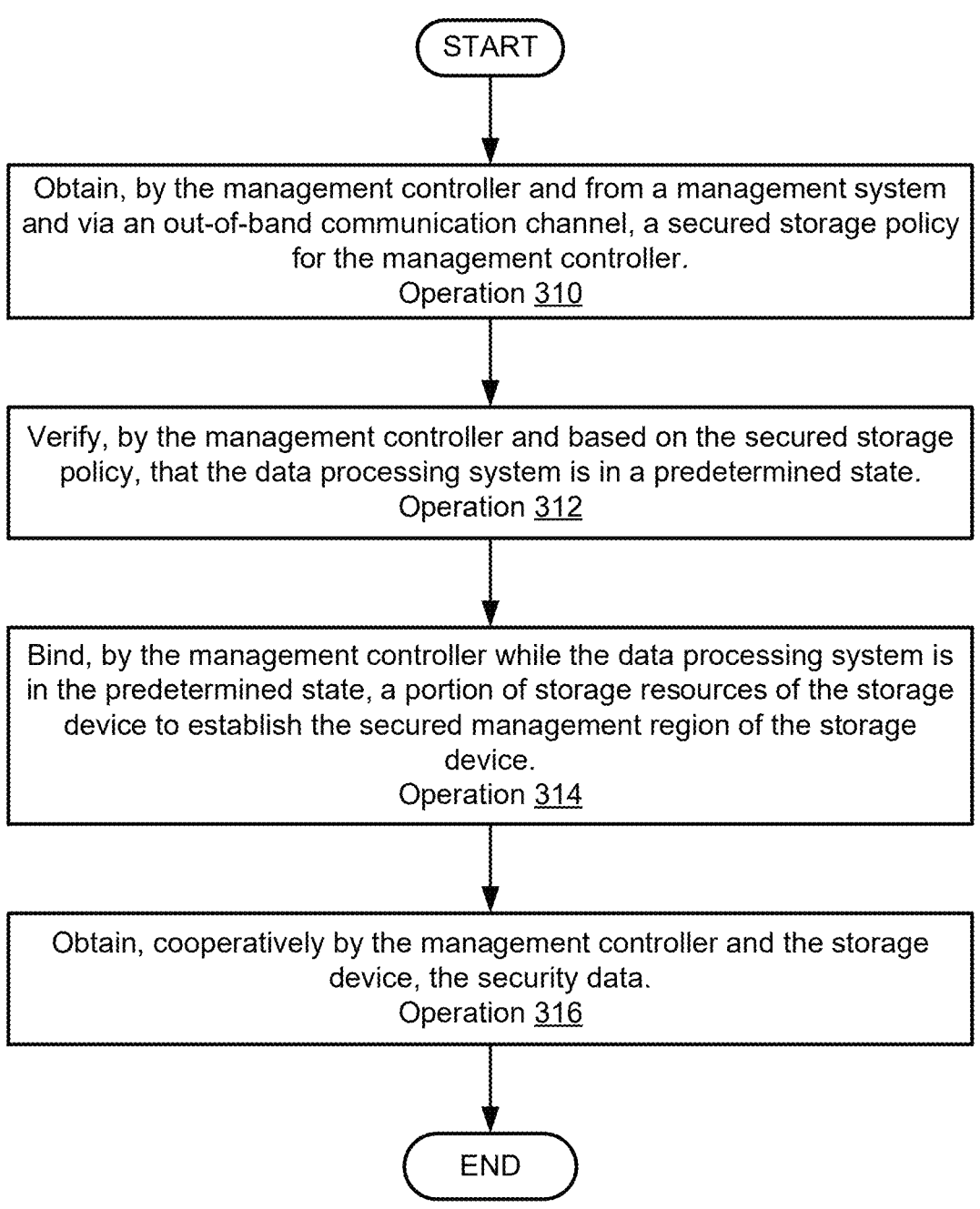

START

Obtain, by the management controller and from a management system and via an out-of-band communication channel, a secured storage policy for the management controller.
Operation 310

Verify, by the management controller and based on the secured storage policy, that the data processing system is in a predetermined state.
Operation 312

Bind, by the management controller while the data processing system is in the predetermined state, a portion of storage resources of the storage device to establish the secured management region of the storage device.
Operation 314

Obtain, cooperatively by the management controller and the storage device, the security data.
Operation 316

END

FIG. 3B

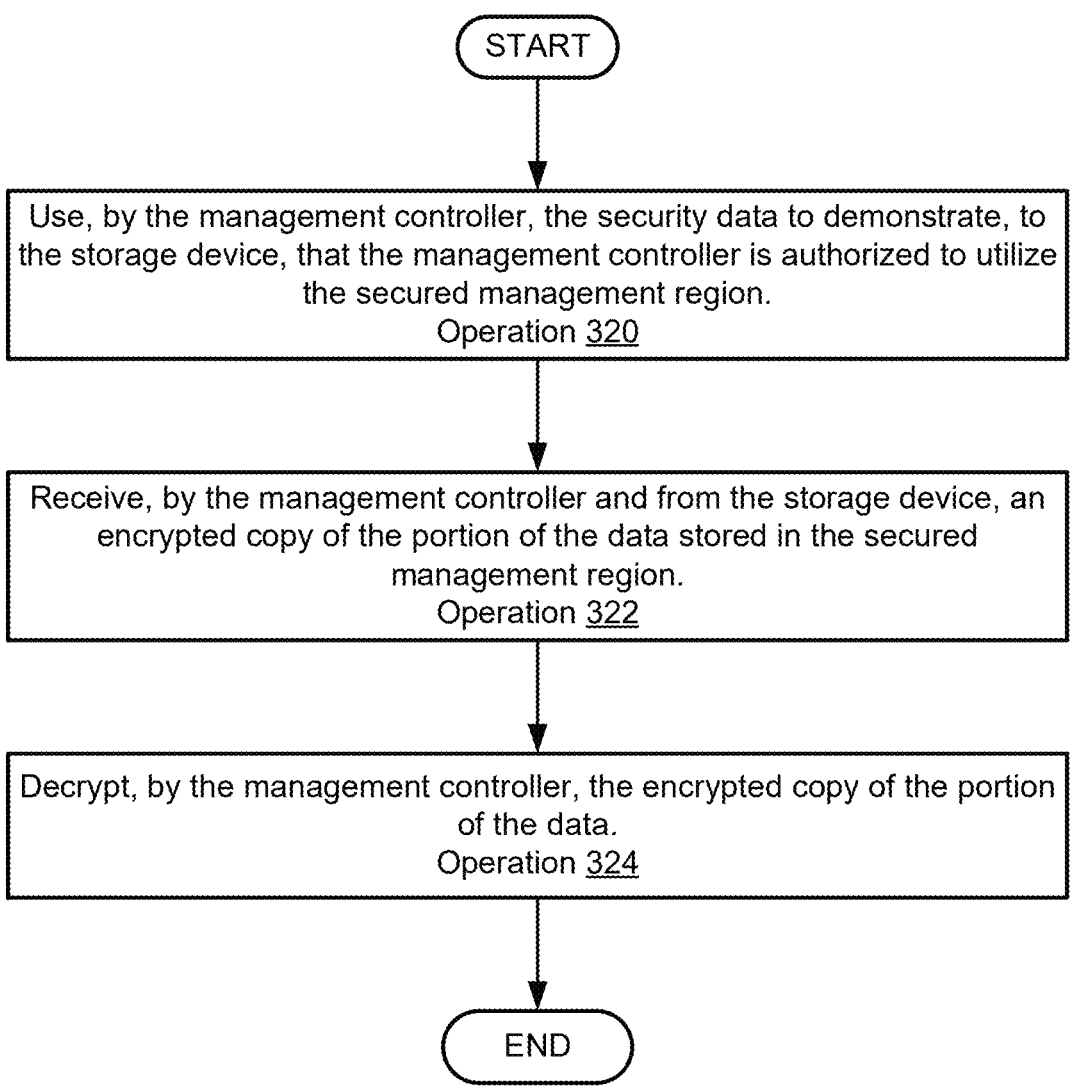

START

Use, by the management controller, the security data to demonstrate, to the storage device, that the management controller is authorized to utilize the secured management region.
Operation 320

Receive, by the management controller and from the storage device, an encrypted copy of the portion of the data stored in the secured management region.
Operation 322

Decrypt, by the management controller, the encrypted copy of the portion of the data.
Operation 324

END

FIG. 3C

MANAGING A DATA PROCESSING SYSTEM USING A MANAGEMENT CONTROLLER AND A SECURED STORAGE REGION

FIELD

Embodiments disclosed herein relate generally to managing operation of a data processing system. More particularly, embodiments disclosed herein relate to managing operation of the data processing system by using a secured management region of a storage device hosted by hardware resources of the data processing system and established cooperatively between a management controller of the data processing system and the storage device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2B show interaction diagrams in accordance with an embodiment.

FIGS. 3A-3C show flow diagrams illustrating methods in accordance with an embodiment.

DETAILED DESCRIPTION

Figure 1A:
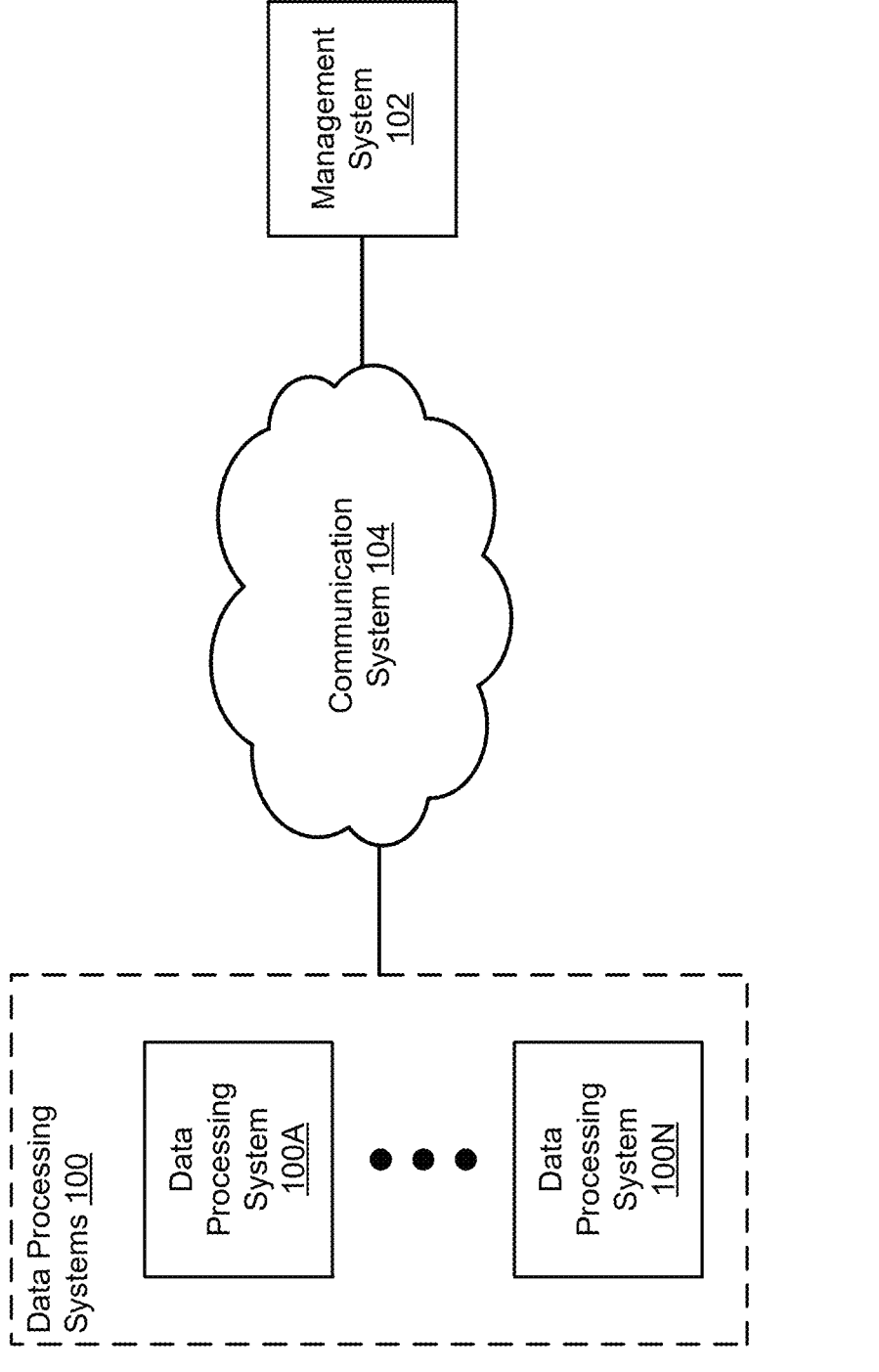
FIGS. 1A-1B show diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing systems may provide computer-implemented services to any type and number of other devices and/or users of the data processing systems. The computer-implemented services may include any quantity and type of such services.

While providing the computer-implemented services, hardware resources of a data processing system may utilize data stored on a storage device hosted by the hardware resources. For example, the data processing system may store a portion of data on the storage device (e.g., a solid state drive, a hard drive, etc.), access the portion of the data from the storage device, perform operations using the portion of the data, and/or perform any other actions to modify operation of the data processing system.

To modify operation of the data processing system in an event of compromise and/or reduced functionality of at least a portion of the hardware resources, the data processing system may host a management controller that may operate independently from the hardware resources and may be distinct from and adapted to manage the hardware resources.

To provide its functionality, the management controller may require access to a portion of data stored on the storage device hosted by the hardware resources. For example, the management controller may require a file (e.g., an image of a new management entity) that may exceed storage capacity of the management controller and therefore, may utilize storage resources of the storage device hosted by the hardware resources.

However, and availability of and/or trust in data stored on the storage device hosted by the hardware resources may be reduced in the event of compromise of the at least a portion of the hardware resources. For example, the management controller may be unable to access a portion of data stored on the storage device when the hardware resources are in a depowered state and/or may be unable to trust the portion of the data obtained from the storage device when the hardware resources are in a compromised state. Thus, a quality of computer-implemented services provided by the data processing system may be negatively impacted.

To improve a likelihood that a portion of data stored on the storage device may be reliably accessed by the management controller, the management controller may obtain the portion of the data from a secured management region of the storage device. The secured management region of the storage device may be established cooperatively by the management controller and the storage device.

To establish the secured management region of the storage device, the management controller may obtain a secured storage policy from a management system (e.g., a second data processing system operated by an owner of the first data processing system and used to manage the computer-implemented services provided by the first data processing system). Using at least the secured storage policy, the management controller may bind a portion of storage resources of the storage device to establish the secured management region of the storage device.

When a data access event for a portion of data stored on the secured management region of the storage device is identified by the management controller, the management controller may subsequently obtain the portion of the data from the secured management region of the storage device via a side band channel and using security data cooperatively established by the management controller and the storage device. For example, to obtain the data, the management controller may demonstrate data access authorization to the storage device (e.g., using a key of the security data) to receive an encrypted copy of the portion of the data. The management controller may subsequently decrypt the encrypted copy of the portion of the data (e.g., using a second key of the security data). Once obtained, the portion of the data may be used by the management controller to provide computer-implemented services.

Thus, embodiments disclosed herein may provide an improved method for managing operation of a data processing system by establishing a secured management region of a storage device hosted by hardware resources of the data processing system. By doing so, a management controller of the data processing system may securely obtain data from the secured management region of a storage device to provide computer-implemented services that may be less likely to be impacted by a potentially compromised state of the hardware resources.

In an embodiment, a method for managing operation of a data processing system is provided. The method may include: (i) identifying, by a management controller of the data processing system, an occurrence of a data access event for a portion of data stored on a secured management region of a storage device hosted by hardware resources of the data processing system; (ii) based on the identifying: (a) obtaining, by the management controller and from the secured management region of the storage device, the portion of the data via a side band channel and using security data cooperatively established by the management controller and the storage device; and (b) providing computer-implemented services using the portion of the data.

The method may also include: prior to identifying the occurrence of the data access event: (i) establishing, cooperatively by the management controller and the storage device, the secured management region of the storage device while the data processing system is operating in a predetermined state; and (ii) obtaining, cooperatively by the management controller and the storage device, the security data.

Establishing the secured management region of the storage device may include: (i) obtaining, by the management controller and from a management system and via an out-of-band communication channel, a secured storage policy for the management controller; (ii) verifying, by the management controller and based on the secured storage policy, that the data processing system is in the predetermined state; and (iii) binding, by the management controller while the data processing system is in the predetermined state, a portion of storage resources of the storage device to establish the secured management region of the storage device.

The secured storage policy may limit when the binding of the portion of the storage resources is authorized to be performed.

The predetermined state may be during a startup of the data processing system.

The predetermined state may be while the data processing system is in a predetermined network environment.

The predetermined state may be while the hardware resources are hosting instances of a limited number and type of applications.

The data access event may be initiation of installation of a new management entity for the hardware resources.

The installation of the new management entity may include: (i) downloading an image of the new management entity, a size of the new management entity exceeding storage capacity of the management controller; (ii) storing, at least temporarily, the image in the secured management region; and (iii) using the at least temporarily stored image to install the new management entity on the hardware resources.

Obtaining the portion of the data may include: (i) using, by the management controller, the security data to demonstrate, to the storage device, that the management controller is authorized to utilize the secured management region; (ii) receiving, by the management controller and from the storage device, an encrypted copy of the portion of the data stored in the secured management region; and (iii) decrypting, by the management controller, the encrypted copy of the portion of the data.

The data processing system may include the hardware resources and a network module adapted to separately advertise network endpoints for the management controller and the hardware resources, the network endpoints being usable by a remote entity to address communications to the hardware resources using an in-band communication channel and the management controller using an out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services (e.g., to user of the system and/or devices operably connected to the system).

Figure 1B:
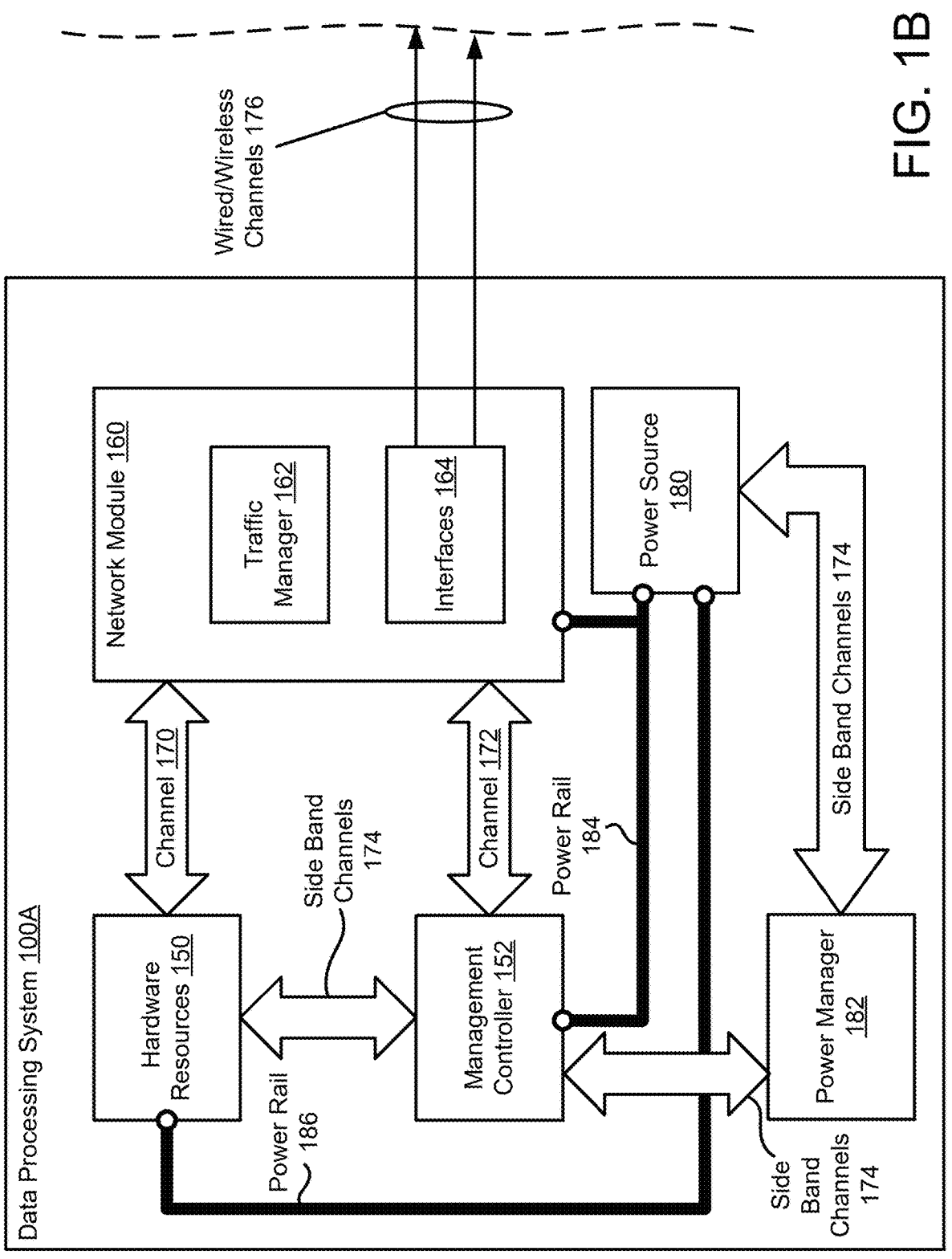

The system may include any number of data processing systems 100 (e.g., computing devices) that may each include any number of hardware components (e.g., processors, memory modules, storage devices, communication devices, etc.). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 100.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, management system 102, and/or any other type of devices (not shown in FIG.

1A). Other types of computer-implemented services may be provided by the system shown in FIG. 1A without departing from embodiments disclosed herein.

The computer-implemented services may be provided at least in part, by hardware resources of data processing systems 100. To do so, the hardware resources may utilize data stored on a storage device hosted by the hardware resources. For example, a processor hosted by the hardware resources may access the data (e.g., an image of a new management entity) for use in modifying operation of the hardware resources by retrieving the data from the storage device via an in-band channel. Because the hardware resources may be subject to compromise and/or reduced functionality, data processing system 100A may include a management controller.

The management controller may operate independently from the hardware resources and may be distinct from and adapted to manage the hardware resources. To manage the hardware resources, the management controller may communicate information with remote entities (e.g., management system 102). To facilitate the communication, data processing system 100A may host a network module adapted to separately advertise network endpoints for the management controller and the hardware resources so that management system 102 communicate with the hardware resources using an in-band communication channel and the management controller using an out-of-band communication channel.

Furthermore, to manage the hardware resources, the management controller may require access to a portion of data stored on the storage device hosted by the hardware resources. The management controller may obtain the portion of the data from the storage device via a side band channel. For example, the management controller may require a file (e.g., an image of a new management entity) that may exceed storage capacity of the management controller and therefore, may utilize storage resources of the storage device hosted by the hardware resources.

However, and availability of and/or trust in data stored on the storage device hosted by the hardware resources may be reduced in the event of compromise and/or reduced functionality of at least a portion of the hardware resources. For example, the management controller may be unable to access a portion of data stored on the storage device when the hardware resources are in a depowered state and/or may be unable to trust the portion of the data obtained from the storage device when the hardware resources are in a compromised state. Thus, a quality of computer-implemented services provided by the management controller may be negatively impacted.

In general, embodiments disclosed herein relate to systems, devices, and methods for managing operation of a data processing system. To manage the operation of a data processing system, the management controller may obtain a portion of data from a secured management region of a store device hosted by hardware resources of the data processing system. The secured management region and security data may be established, cooperatively by the management controller and the storage device, and may allow for secure communication of data using the security data.

To establish the secured management region of the storage device, the management controller may obtain a secured storage policy from management system 102 (e.g., a second data processing system operated by an owner of the first data processing system and used to manage the computer-implemented services provided by the first data processing system).

The secured storage policy may be communicated to the management controller via an out-of-band communication channel.

The secured storage policy may include, for example, instructions and/or limitations for binding of a portion of storage resources of the storage devices. The secure storage policy may define a predetermined state that the binding of the portion of the storage resources is authorized to be performed. The predetermined state may include, for example, during a startup of data processing system 100A, while data processing system 100A is in a predetermined network environment (e.g., enhanced access control, firewall configurations, etc.), while the hardware resources are hosting instances of a limited number and/or type of applications, and/or any other conditions.

When data processing system 100A is verified to be in the predetermined state according to the secured storage policy, the management controller may bind a portion of storage resources of the storage device to establish the secured management region of the storage device. For example, a logical segment (e.g., a namespace) of the storage device may be created using a storage device protocol (e.g., nonvolatile memory express (NVMe)) and according to the secured storage policy. Additionally, security data (e.g., an encryption key pair) may be generated (e.g., cooperatively between the management controller and the storage device), stored, and enforced on the logical segment to establish the secured management region of the storage device.

When a data access event for a portion of data stored on the secured management region of the storage device is identified by the management controller, the management controller may subsequently obtain the portion of the data from the secured management region of the storage device via a side band channel and using the security data. For example, to obtain the data, the management controller may demonstrate data access authorization to the storage device (e.g., using a key of the security data) to receive an encrypted copy of the portion of the data. The management controller may subsequently decrypt the encrypted copy of the portion of the data (e.g., using a second key of the security data). Once obtained, the portion of the data may be used by the management controller to provide computer-implemented services.

For example, consider a scenario in which the management controller may obtain instructions (e.g., from a management system 102, an administrator of data processing system 100A, etc.) to initiate an installation of a new management entity for the hardware resources while the hardware resources are in a compromised state. The management controller may subsequently download an image of the new management entity (e.g., that may exceed storage capacity of the management controller), store the image (at least temporarily) in the secured management region of the storage device, access the stored image to install the new management entity on the hardware resources, and/or any perform any other actions to provide desired computer-implemented services.

To provide the above noted functionality, the system may include data processing systems 100, and management system 102. Each of these components is discussed below.

Data processing systems 100 may include any number of data processing systems (e.g., 100A-100N) that may individually and/or cooperatively provide at least a portion of the computer-implemented services. Any of data processing systems 100 may include in-band components (e.g., hardware resources), out-of-band components (e.g., management controller, network modules, etc.), and functionality that may allow the out-of-band components to communicate with management system 102 via an out-of-band communication channel.

While providing the at least a portion of the computer-implemented services, a data processing system (e.g., 100A) of data processing systems 100 may communicate with and/or obtain information from management system 102. For example, data processing system 100A may obtain instructions relevant to establishing a secured management region of a storage device hosted by hardware resources of data processing system 100A, management requests to modify operation of the hardware resources (e.g., installing new applications), and/or any other information. Data processing system 100A may subsequently perform actions based on the information obtained from management system 102 to update operation of data processing system 100A.

Management system 102 may, as discussed above, provide remote management services. Management system 102 may include, for example, a second data processing system operated an owner of data processing systems 100. To provide the remote management services, management system 102 may interact with data processing systems 100 to obtain and/or provide information (e.g., data) relevant to operation of data processing systems 100. For example, management system 102 may generate and provide a secured storage policy to a data processing system of data processing systems 100 for use in establishing a secured management region of a storage device hosted by the data processing system. The secured storage policy may be defined by management system 102 to limit a level of security relevant to operations for managing storage devices hosted by data processing systems 100.

While providing their functionality, any of data processing systems 100, and management system 102 may provide all or a portion of the methods shown in FIGS. 2A-3C.

Communication system 104 may allow any of data processing systems 100, and management system 102 to communicate with one another (and/or with other devices not illustrated in FIG. 1A). To provide its functionality, communication system 104 may be implemented with one or more wired and/or wireless networks. Any of these networks may be a radio access network (e.g., a cellular core network), a private network (e.g., the "Network" shown in FIG. 4), a public network, and/or may include the Internet. For example, data processing systems 100 may be operably connected to management system 102 via the Internet. Data processing systems 100, management system 102, and/or communication system 104 may be adapted to perform one or more protocols for communicating via communication system 104.

Any of (and/or components thereof) data processing systems 100, and management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1A, a system in accordance with an embodiment may manage operation of a data processing system by establishing a secured management region of a storage device hosted by hardware resources of the data processing system. By doing so, a management controller may obtain data from the secured management region in a secure manner for use in providing computer-implemented services.

While illustrated in FIG. 1A with a limited number of specific components, a system may include additional, fewer, and/or different components without departing from embodiments disclosed herein.

Turning to FIG. 1B, a diagram illustrating a data processing system in accordance with an embodiment is shown. Data processing system 100A shown in FIG. 1B may be similar to any of the data processing systems shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components.

The storage may include any number and/or types of storage devices (e.g., hard drives, solid state drives, etc.). A storage device of the storage devices may include, for example, memory (e.g., non-volatile memory), a controller that may manage data operations (e.g., storage, retrieval, organization, etc.), and/or other physical components. The storage device may support storage protocols (e.g., non-volatile memory express) that may facilitate use of storage resources of the storage device.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To provide the management functionalities, management controller 152 may utilize data that may, at least temporarily be stored on storage resources hosted by management controller 152. For example, management controller may download an image of a new management entity (e.g., firmware, application, etc.) in response to a management request, store the image, and install the new management entity using at least the image on hardware resources 150.

Because an ability of management controller 152 to provide the management functionalities may be limited when the data exceeds storage capacity of storage resources hosted by the management controller, management controller 152 may utilize any number and/or types of storage devices hosted by hardware resources 150.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels).

The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, management controller 152 may communicate information relevant to establishing a secured management region of a storage device hosted by hardware resources via side band channels 174. The information may include, for example, a request for a portion of storage resources of the storage device, parameters for the portion of the storage resources, a security policy for access to the portion of the storage resources, and/or any other information. By doing so, management controller 152 may communicate with the storage device to securely obtain data from the secured management region for use in performing management functionalities.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100A may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

For example, management system 102 may generate a secured storage policy (e.g., that may define when binding of a storage device may occur) and transmit the secured storage policy to a network addressable endpoint of management controller 152. By doing so, management controller 152 may obtain and perform management functionalities using the secured storage policy regardless of an operating state of hardware resources 150.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations illustrated in FIGS. 2A-3C.

While illustrated in FIG. 1B with a limited number of specific components, a system may include additional, fewer, and/or different components without departing from embodiments disclosed herein.

Figure 2A:
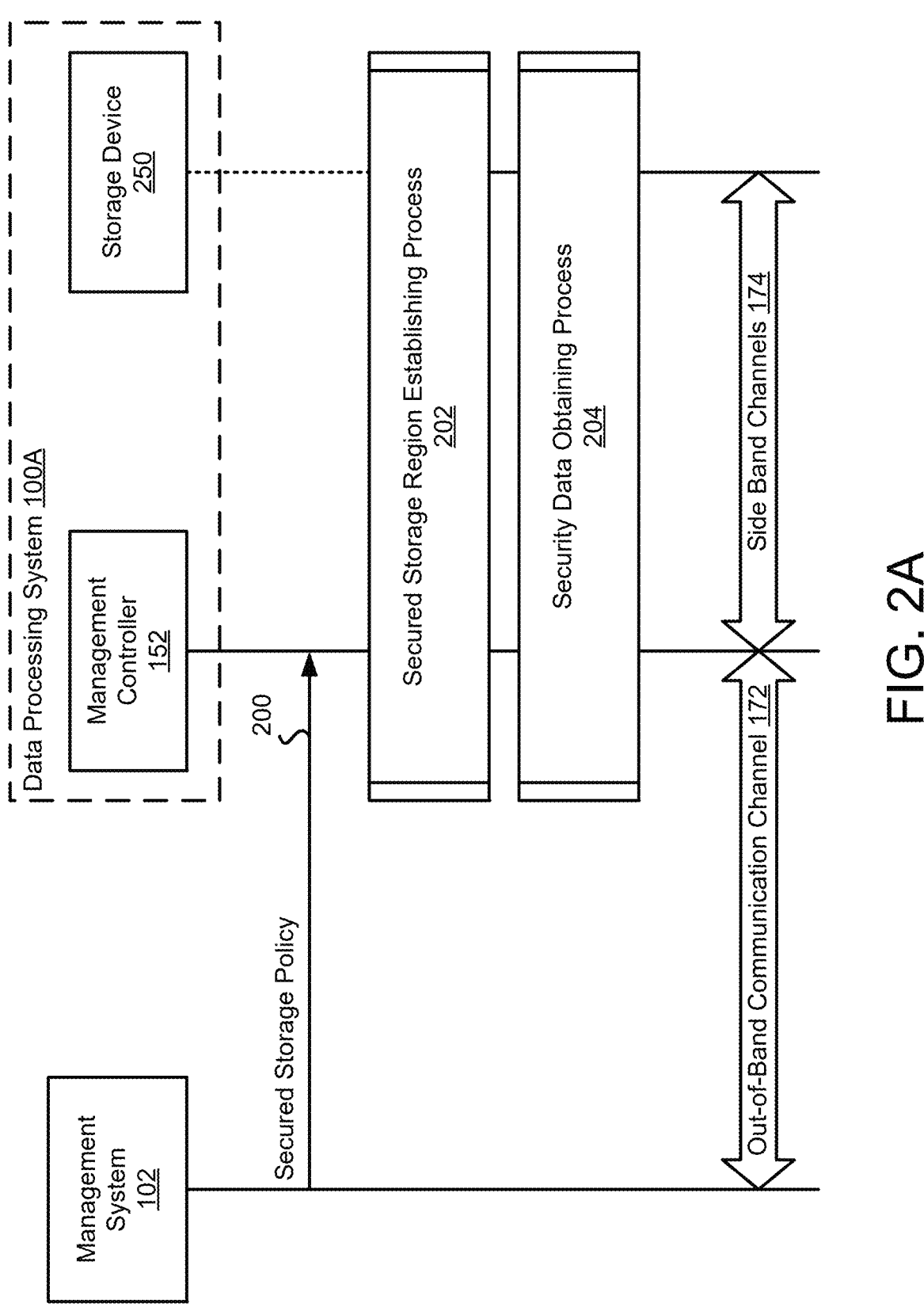
Figure 2B:
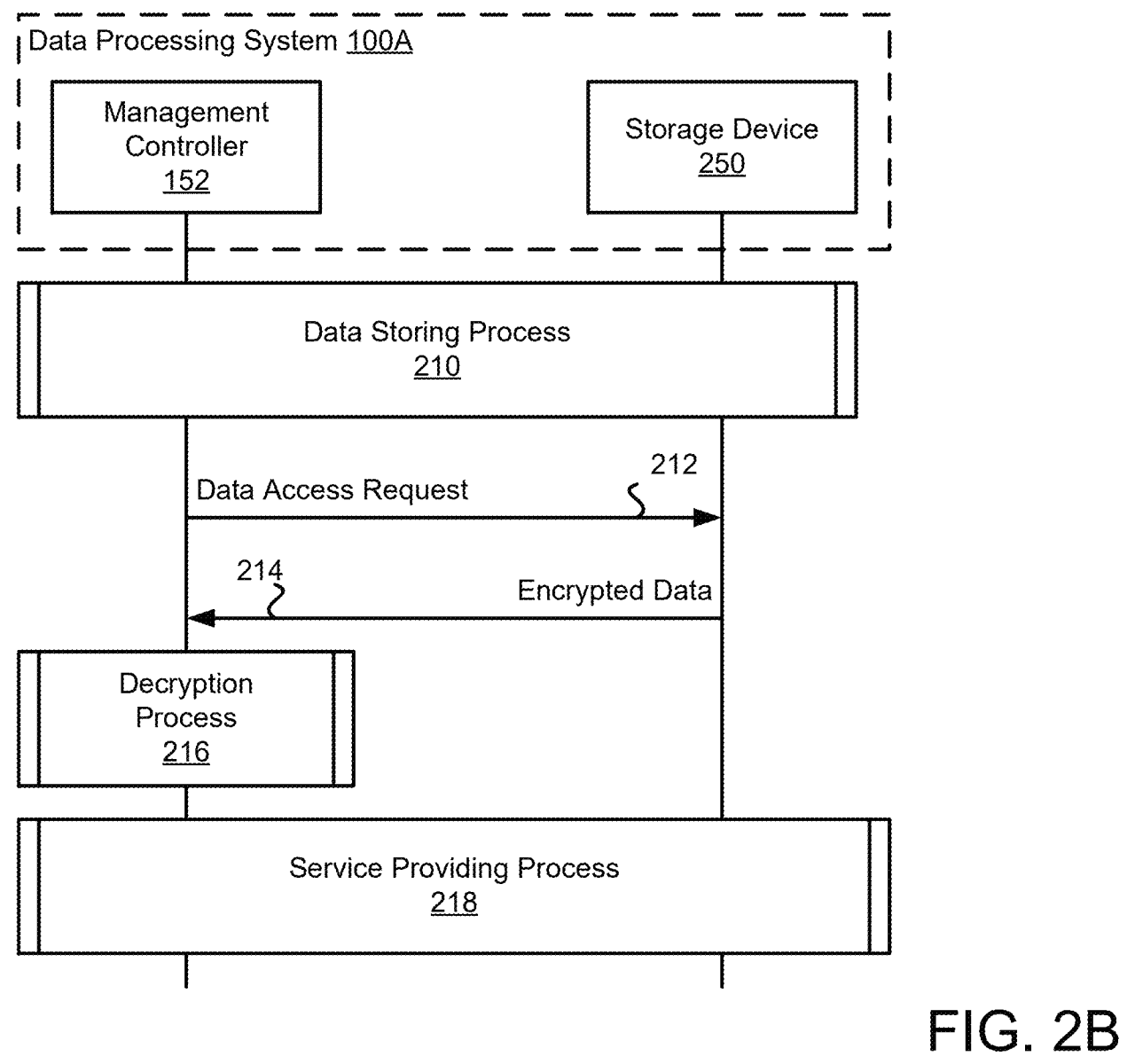

To further clarify embodiments disclosed herein, interaction diagrams in accordance with an embodiment are shown in FIGS. 2A-2B. The interaction diagrams may illustrate how data may be obtained and used within the system of FIGS. 1A-1B.

In the interaction diagrams, processes performed by and interactions between components of a system in accordance with an embodiment are shown. In the diagrams, components of the system are illustrated using a first set of shapes (e.g., 102, 152, etc.), located towards the top of each figure. Lines descend from these shapes. Processes performed by the components of the system are illustrated using a second set of shapes (e.g., 202, 204, etc.) superimposed over these lines. Interactions (e.g., communication, data transmissions, etc.) between the components of the system are illustrated using a third set of shapes (e.g., 200, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the process labeled as 202. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during establishing of a secured management region of a storage device hosted by hardware resources of a data processing system.

Storage device 250 may include, a storage device hosted by hardware resources 150. Storage device 250 may host physical components, for example, memory (e.g., non-volatile memory), a controller that may manage data operations (e.g., storage, retrieval, organization, etc.), and/or other physical components. The storage device may support storage protocols (e.g., non-volatile memory express) that may facilitate use of storage resources of storage device 250.

At interaction 200, a secured storage policy may be provided to management controller 152 by management system 102. For example, the secured storage policy may be generated and provided to management controller 152 by (i) defining a level of security (e.g., predetermined states of data processing system 100A) for establishing the secured management region, (ii) transmitting the secured storage policy via a message using out-of-band communication channel 172, and/or any other processes. By providing the secured storage policy to management controller 152, management controller 152 may establish the secured management region according to the secured storage policy.

To establish the secured management region of the storage device, secured storage region establishing process 202 may be performed. During secured storage region establishing process 202, a state of data processing system 100A may be verified based on the secured storage policy, and a portion of storage device 250 may be bound by management controller 152. For example, the state of data processing system 100A may be verified by management controller 152 by (i) obtaining, from the hardware resources, information relevant to an operating state of the hardware resources in response to a management request issued via side band channels 174, (ii) comparing the information of the operating state to a predetermined state defined by the secured storage policy, (iii) identifying that the hardware resources are performing a booting process, (iv) obtaining a list of applications hosted and/or executed by the hardware resources, and/or performing any other actions.

Once verified that data processing system 100A is in the predetermined state based on the secured storage policy, the portion of storage device 250 may be bound to establish the secured management region. For example, the portion of storage device 250 may be bound by (i) configuring a logical segment (e.g., a namespace) of storage device 250 with parameters for the logical segment (e.g., capacity, format, data security settings, etc.), (ii) associating the logical segment to management controller 152, and/or any other processes. By doing so, the secured management region of storage device 250 may be established and/or adapted to communicate with management controller 152.

To establish security data for secure communication of data from the secured management region, security data obtaining process 204 may be performed. During security data obtaining process 204, security data may be cooperatively generated and stored by management controller 152 and storage device 250. For example, to cooperatively generate the security data, management controller 152 and/or storage device 250 may (i) apply any number and/or types of encryption algorithms to generate a key pair (e.g., a public/private key), (ii) store the key pair in storage hosted by both management controller and storage device 250, (iii) rotate the key pair, and/or any other processes. By doing so, the security data may be used to demonstrate authorization while communicating data to and/or from the secured management region of storage device 250.

Out-of-band communication channel 172 may be used to facilitate communication between management controller 152 and management system 102, and is shown to indicate that the communication directed between management controller 152 and management system 102 may not flow through any of the in-band components (e.g., hardware resources 150 of data processing system 100A).

Side band channels 174 may be used to facilitate communication between management controller 152 and storage device 250, and is shown to indicate that management controller 152 may interface with storage device 250 by performing management commands may include, for example, accessing secured data, providing authorization information (e.g., security data), obtaining information regarding an operating state of hardware resources 150, installing management entities on hardware resources 150 using the data, and/or performing any other actions.

Thus, using processes and interactions shown in FIG. 2A, a secured management region of a storage device may be established. The secured management region of the storage device may allow for secure storage and/or communication of data that may be utilized by a management controller of the data processing system to manage operation of a data processing system.

Turning to FIG. 2B, a second interaction diagram in accordance with an embodiment is shown. The second interaction diagram may illustrate processes and interactions that may occur during updating of operations of a data processing system by a management controller of the data processing system.

To update operations of the data processing system, data storing process 210 may be performed. During data storing process 210, management controller 152 may obtain data relevant to modifying operations of data processing system 100A, and store the data in the secured management region at least temporarily. For example, to obtain the data relevant to modifying operations of data processing system 100A, management controller 152 may (i) receive a request indicating a desire to modify operations of data processing system 100A (e.g., from a management system, administrator of data processing system 100A, etc.), (ii) download data relevant to the request (e.g., an image of a new management entity) via network communications with a remote entity (not shown), (iii) identify that the data may exceed a storage capacity of management controller 152, and/or perform any other actions.

Once obtained, the data may be stored, at least temporarily on the secured management region of storage device 250. For example, the data may be stored on the secured management region of storage device 250 by (i) issuing, by management controller 152, a write request to storage device 250 via a side band channel, (ii) identifying, by storage device 250, that the data is to be stored in the secured management region, (iii) demonstrating, cooperatively between management controller 152 and storage device 250, authorization to access the secured management region using the security data, (iv) processing, by storage device 250, the data to write the data to the secured management region of storage device 250, and/or any other processes.

At interaction 212, a data access request may be provided to storage device 250 by management controller 152. For example, the data access request may be generated and provided to storage device 250 by (i) issuing a read request to storage device 250 via a side band channel, (ii) providing information relevant to the data (e.g., file path, data block address, etc.), (iii) providing a portion of security data (e.g., a credential, token, etc.) to authenticate the data access request, and/or any other processes.

At interaction 214, encrypted data may be provided to management controller by storage device 250. The encrypted data may be generated and provided to management controller 152 by: (i) retrieving an encrypted copy of a portion of the data requested from the secured management region, (ii) transmitting the encrypted copy of the portion of the data via a side channel to management controller 152, and/or performing any other actions. By providing the encrypted data to management controller 152, management controller 152 may decrypt the encrypted data for use in providing computer-implemented services.

To decrypt the encrypted data, decryption process 216 may be performed. During decryption process 216, the encrypted data may be decrypted by management controller 152. For example, to decrypt the encrypted data, management controller 152 may (i) access a key (e.g., a public/private key, a symmetric key, etc.) stored on management controller 152, (ii) apply a decryption algorithm using the key, (iii) read the portion of the data (e.g., a plaintext format of the portion of the data), and/or performing any other actions.

To provide services using the portion of the data, service providing process 218 may be performed. During service providing process 218, operation of data processing system 100 may be updated. For example, to update operation of data processing system 100, management controller 152 may (i) install a new management entity (e.g., an application, driver, firmware etc.) for the hardware resources, (ii) reprovision a portion of storage device 250, (iii) migrate a second portion of data stored on storage device 250 (e.g., to maintain data quality standards, security standards, etc.), and/or any other processes.

Thus, using processes and interactions shown in FIG. 2B, a portion of data may be securely accessed from a secured management region of a storage device by a management controller hosted by a data processing system. By doing so, the management controller may use the portion of data to provide computer-implemented services that may have a higher level of quality and/or security compared to computer-implemented services that may be provided without the secured management region of the storage device.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1B may perform various methods to manage a data processing system. FIGS. 3A-3C illustrate methods that may be performed by the components of the system of FIGS. 1A-1B. In the diagrams discussed below and shown in FIGS. 3A-3C, any of the operations may be repeated, performed in different orders, and/or performed in parallel with or in a partially overlapping in time manner with other operations.

Turning to FIG. 3A, a first flow diagram illustrating a method of managing operation of a data processing system in accordance with an embodiment is shown. The method may be performed, for example, by any of the components of the system of FIGS. 1A-1B, and/or other components not shown therein.

At operation 300, an occurrence of a data access event for a portion of data stored on a secured management region of a storage device hosted by hardware resources of the data processing system may be identified by a management controller of the data processing system. The occurrence of the data access event may be identified by: (i) receiving a request to update an operating state of the data processing system, (ii) initiating an installation of a new management entity for the hardware resources, (iii) downloading data (e.g., a disc image) relevant to a new management entity, (iv) identifying that the data may exceed a storage capacity of the management controller, and/or any other processes. Refer to FIG. 3B for additional details regarding establishing the secured management region of the storage device.

At operation 302, the portion of the data may be obtained by the management controller from the secured management region of the storage device. The portion of the data may be obtained by: (i) authenticating a data access request using a portion of security data (e.g., credentials, a token, etc.), (ii) receiving an encrypted copy of the portion of the data from the secured management region and via a side band channel, (iii) decrypting the encrypted copy of the portion of the data (e.g., using a portion of a public/private key pair), and/or any other processes. Refer to FIG. 3C for additional details regarding obtaining data from the secured management region of the storage device.

At operation 304, computer-implemented services may be provided using the portion of the data. The computer-implemented services may be provided by: (i) installing a new management entity (e.g., an application, driver, firmware etc.), (ii) reprovisioning a portion of the storage device, (iii) migrating a second portion of data stored on the storage device, and/or any other processes.

The method may end following operation 304.

Using the method shown in FIG. 3A, operation of a data processing system may be managed using a management controller by securely obtaining data from a secured management region of a storage device hosted by hardware resources of the data processing system.

Turning to FIG. 3B, a second flow diagram illustrating a method of establishing a secured management region of a storage device is shown. The method may be performed, for example, by any of the components of the system of FIGS. 1A-1B, and/or other components not shown therein.

At operation 310, a secured storage policy may be obtained by the management controller from a management system. The secured storage policy may be obtained by: (i) defining, by the management system, a level of security (e.g., a predetermined state of the data processing system) for establishing the secured management region, (ii) transmitting the secured storage policy via a message using an out-of-band communication channel, and/or any other processes.

At operation 312, the data processing system may be verified to be in the predetermined state by the management controller. The data processing system may be verified by (i) identifying that the hardware resources are performing a booting process, (ii) obtaining a list of applications hosted and/or executed by the hardware resources, (iii) obtaining, from the hardware resources, information relevant to an operating state of the hardware resources, (iv) comparing the information of the operating state to a predetermined state defined by the secured storage policy, and/or any other processes.

At operation 314, a portion of storage resources of the storage device may be bound by the management controller while the data processing system is operating in the predetermined state. The portion of storage resources may be bound by: (i) invoking a storage device binding protocol (e.g., NVMe), (ii) configuring a logical segment (e.g., a namespace) of the storage device using parameters for the logical segment (e.g., capacity, format, data security settings, etc.), (iii) attaching the logical segment to the management controller, and/or any other processes.

At operation 316, the security data may be obtained cooperatively by the management controller and the storage device. The security data may be obtained by: (i) applying any number and/or types of encryption algorithms to generate a key pair (e.g., a public/private key), (ii) using a secure crypto-processor (e.g., a trusted platform module), (iii) storing the security data in storage hosted by both the management controller and storage device, (iv) rotating the security data at periodic intervals, and/or any other processes.

The method may end following operation 316.

Using the method shown in FIG. 3B, a secured management region of a storage device hosted by hardware resources may be established cooperatively between a management controller of the data processing system and the storage device.

Turning to FIG. 3C, a third flow diagram illustrating a method of accessing data stored on the secured management region of the storage device in accordance with an embodiment is shown. The method may be performed, for example, by any of the components of the system of FIGS. 1A-1B, and/or other components not shown therein.

At operation 320, the security data may be used by the management controller to demonstrate to the storage device that the management controller is authorized to utilize the secured management region. The security data may be used by: (i) providing a credential (e.g., a password) to the storage device, (ii) attaching a token to a read request for the portion of the portion, (iii) providing a portion of a public-private key pair, and/or any other processes.

At operation 322, an encrypted copy of the portion of the data may be received by the management controller from the storage device. The encrypted copy of the portion of the data may be obtained by: (i) issuing a read request for the portion of the data, (ii) receiving a transmission of the encrypted copy of the portion of the data via a side band channel, and/or any other processes.

At operation 324, the encrypted copy of the portion of the data may be decrypted by the management controller. The encrypted copy of the portion of the data may be decrypted by: (i) accessing a key (e.g., a public/private key, a symmetric key, etc.) stored on the management controller, (ii) applying a decryption algorithm using the key, (iii) reading the portion of the data (e.g., a plaintext format of the portion of the data), and/or any other processes.

The method may end following operation 324.

Thus, using the methods shown in FIGS. 3A-3C, operation of a data processing system may be managed by using a management controller to establish and utilize a secured management region of storage device hosted by hardware resources of the data processing system. By doing so, data may be securely obtained by the management controller for use in providing computer-implemented services.

Figure 4:
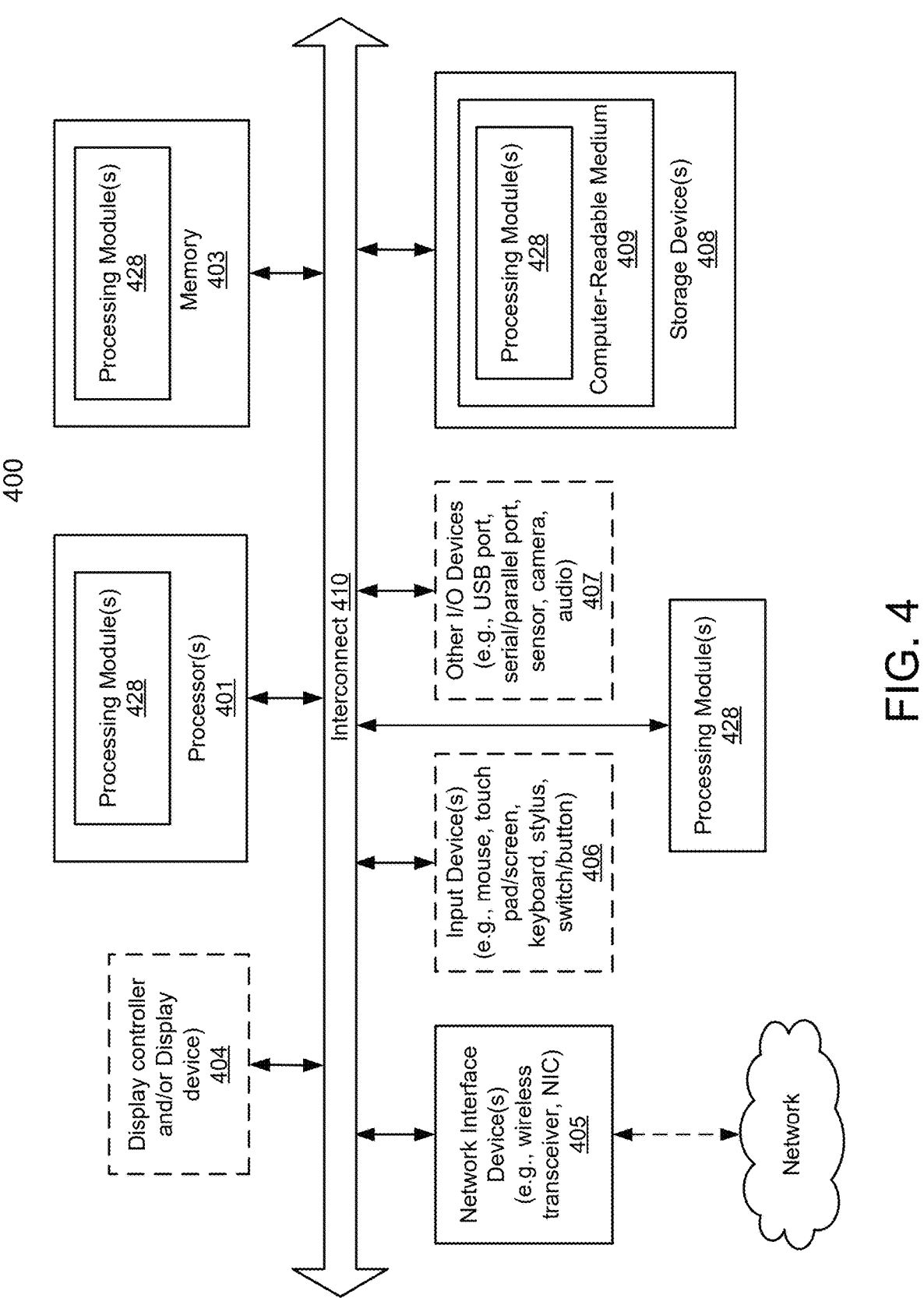
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both.

Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a data processing system, the method comprising:

identifying, by a management controller that is physically installed within the data processing system, an occurrence of a data access event for a portion of data stored on a secured management region of a storage device hosted by hardware resources of the data processing system, the management controller being a separate and independently operating computing device from the data processing system, and the management controller comprising a first processor that is separate and independently operating from a second processor of the data processing system;

based on the identifying:

obtaining, by the management controller and from the secured management region of the storage device, the portion of the data via a side band channel and using security data cooperatively established by the management controller and the storage device; and causing, by the management controller, the data processing system to provide computer-implemented services using the portion of the data.

2. The method of claim 1, further comprising:

prior to identifying the occurrence of the data access event:

establishing, cooperatively by the management controller and the storage device, the secured management region of the storage device while the data processing system is operating in a predetermined state.

3. The method of claim 2, wherein establishing the secured management region of the storage device comprises:

verifying, by the management controller and using a secured storage policy, that the data processing system is in the predetermined state; and binding, by the management controller while the data processing system is in the predetermined state, a portion of storage resources of the storage device to establish the secured management region of the storage device.

4. The method of claim 3, wherein the secured storage policy limits when the binding of the portion of the storage resources is authorized to be performed.

5. The method of claim 2, wherein the predetermined state is during a startup of the data processing system.

6. The method of claim 2, wherein the predetermined state is while the data processing system is in a predetermined network environment.

7. The method of claim 2, wherein the predetermined state is while the hardware resources are hosting instances of a limited number and type of applications.

8. The method of claim 1, wherein the data access event is initiation of installation of a new management entity for the hardware resources.

9. The method of claim 8, wherein the installation of the new management entity comprises:

downloading an image of the new management entity, a size of the new management entity exceeding storage capacity of the management controller;

storing, at least temporarily, the image in the secured management region; and using the at least temporarily stored image to install the new management entity on the hardware resources.

10. The method of claim 1, wherein obtaining the portion of the data comprises:

using, by the management controller, the security data to demonstrate, to the storage device, that the management controller is authorized to utilize the secured management region;

receiving, by the management controller and from the storage device, an encrypted copy of the portion of the data stored in the secured management region; and decrypting, by the management controller, the encrypted copy of the portion of the data.

11. The method of claim 1, wherein the data processing system comprises the hardware resources and a network module adapted to separately advertise network endpoints for the management controller and the hardware resources, the network endpoints being usable by a remote entity to address communications to the hardware resources using an in-band communication channel and the management controller using an out-of-band communication channel.

12. The method of claim 11, wherein the management controller and the network module are on separate power domains from the hardware resources so that the management controller and the network module are operable while the hardware resources are inoperable.

13. The method of claim 11, wherein the out-of-band communication channel runs through the network module, and an in-band communication channel that services the hardware resources also runs through the network module.

14. The method of claim 11, wherein the network module hosts a transmission control protocol/internet protocol (TCP/IP) stack to facilitate network communications via the out-of-band communication channel.

15. A non-transitory machine-readable medium having instructions stored therein, which when executed by a processor, cause the processor to perform operations for managing operation of a data processing system, the operations comprising:

identifying, by a management controller that is physically installed within the data processing system, an occurrence of a data access event for a portion of data stored on a secured management region of a storage device hosted by hardware resources of the data processing system, the management controller being a separate and independently operating computing device from the data processing system, and the management controller comprising a first processor that is separate and independently operating from a second processor of the data processing system;

based on the identifying:

obtaining, by the management controller and from the secured management region of the storage device, the portion of the data via a side band channel and using security data cooperatively established by the management controller and the storage device; and causing, by the management controller, the data processing system to provide computer-implemented services using the portion of the data.

16. The non-transitory machine-readable medium of claim 15, wherein the operations further comprise:

prior to identifying the occurrence of the data access event:

establishing, cooperatively by the management controller and the storage device, the secured management region of the storage device while the data processing system is operating in a predetermined state; and obtaining, cooperatively by the management controller and the storage device, the security data.

17. The non-transitory machine-readable medium of claim 16, wherein establishing the secured management region of the storage device comprises:

obtaining, by the management controller and from a management system and via an out-of-band communication channel, a secured storage policy for the management controller;

verifying, by the management controller and based on the secured storage policy, that the data processing system is in the predetermined state; and binding, by the management controller while the data processing system is in the predetermined state, a portion of storage resources of the storage device to establish the secured management region of the storage device.

18. A data processing system, comprising:

a management controller that is physically installed within the data processing system and comprises a first processor;

a second processor; and a memory coupled to the first processor and that store instructions, which when executed by the first processor, cause the first processor to perform operations for managing operation of the data processing system, the operations comprising:

identifying, by the management controller, an occurrence of a data access event for a portion of data stored on a secured management region of a storage device hosted by hardware resources of the data processing system, the management controller being a separate and independently operating computing device from the data processing system, and the first processor is separate and independently operating from the second processor;

based on the identifying:

obtaining, by the management controller and from the secured management region of the storage device, the portion of the data via a side band channel and using security data cooperatively established by the management controller and the storage device; and causing, by the management controller, the data processing system to provide computer-implemented services using the portion of the data.

19. The data processing system of claim 18, wherein the operations further comprise:

prior to identifying the occurrence of the data access event:

establishing, cooperatively by the management controller and the storage device, the secured management region of the storage device while the data processing system is operating in a predetermined state; and obtaining, cooperatively by the management controller and the storage device, the security data.

20. The data processing system of claim 19, wherein establishing the secured management region of the storage device comprises:

obtaining, by the management controller and from a management system and via an out-of-band communication channel, a secured storage policy for the management controller;

verifying, by the management controller and based on the secured storage policy, that the data processing system is in the predetermined state; and binding, by the management controller while the data processing system is in the predetermined state, a portion of storage resources of the storage device to establish the secured management region of the storage device.

* * * * *